W. D. HAINES.
FERTILIZER DISTRIBUTER.
APPLICATION FILED MAR. 25, 1916.
1,251,225. Patented Dec. 25, 1917.
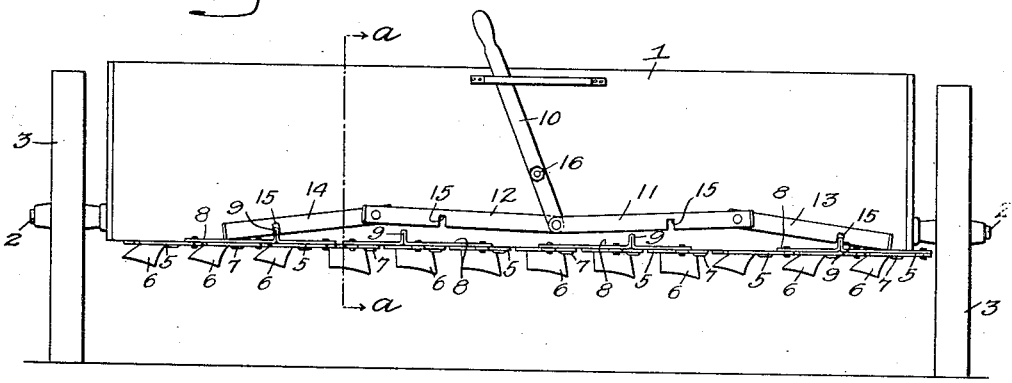
Fig. 1.
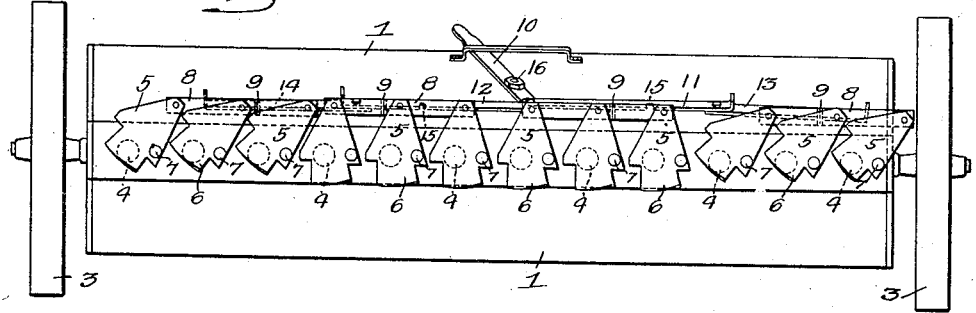
Fig. 2.
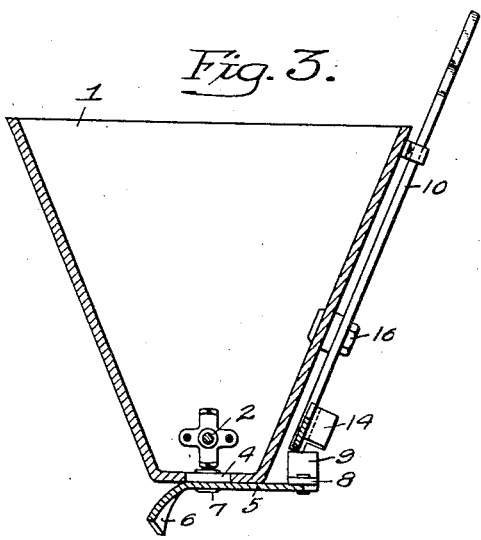
Fig. 3.
Fig. 4.
Inventor:-
William D. Haines
by his Attorneys
Howson & Howson

UNITED STATES PATENT OFFICE.

WILLIAM D. HAINES, OF HADDONFIELD, NEW JERSEY.

FERTILIZER-DISTRIBUTER.

1,251,225.　　　　　Specification of Letters Patent.　　Patented Dec. 25, 1917.

Application filed March 25, 1916. Serial No. 86,603.

*To all whom it may concern:*

Be it known that I, WILLIAM D. HAINES, a citizen of the United States, and a resident of Haddonfield, Camden county, State of New Jersey, have invented a Fertilizer-Distributer, of which the following is a specification.

One object of this invention is to provide a relatively simple, inexpensive and conveniently operated device whereby the number of outlets of a container such as the hopper or box of a fertilizer or seed distributer may be conveniently varied at will, the arrangement being such that the valves controlling the number of groups of outlets may be simultaneously adjusted.

I further desire to provide a novel form of distributing valve for use on a fertilizer or seed distributing device which in addition to spreading powered or granular material delivered from a hopper or box, shall conveniently lend itself to an operative association with means whereby it and other similar valves may be controlled.

Another object of my invention is to provide a fertilizer or seed distributer having a plurality of discharge openings, with a plurality of independent groups of valves for controlling the flow through said openings and mechanism conveniently attached to or detached from the valves for simultaneously operating any particular group or groups independent of the others.

These objects and other advantageous ends I secure as hereinafter set forth, reference being had to the accompanying drawings, in which, Figure 1 is a rear elevation of a fertilizer distributer showing my invention as applied thereto;

Fig. 2 is an inverted plan of the machine shown in Fig. 1;

Fig. 3 is a transverse section on the line a—a, Fig. 1; and

Fig. 4 is a perspective view of one of the valves.

In the above drawings 1 represents the fertilizer containing box or hopper constituting the body of my machine which is provided at its ends with bearings for the reception of a shaft 2 extending longitudinally through it adjacent its bottom, and has wheels 3 mounted on its ends. The box or container 1 tapers in width from its top toward its bottom and the latter is provided with a number of outlet openings 4 for the discharge of fertilizer or other granular material. Adjacent each of said openings I mount a plate 5 constituting a valve, having a triangular body portion and an extension 6 from one end of the former, which extension is warped or bent out of the plane of said body.

Each of the valves is connected to the bottom of the container 1 adjacent the opening 4 which it controls by means of a pivot or pintle 7, being supported thereby in a substantially horizontal plane with its warped extension 6 curved downwardly and outwardly away from this opening. These valves are shown in the present instance as connected in groups of three by means of links or bars 8 pivotally attached to each of them adjacent the apex of its triangular body portion. Thus in the case illustrated, there are four such groups and therefore four links or bars 8. Each of the latter has an upwardly extending projection 9 formed in the present instance by forming in it a U-shaped bend and then pressing together the sides of the same as illustrated.

On the outer surface of the rear side of the container or hopper 1, I pivotally mount an operating lever 10 to whose lower end are pivotally connected two links 11 and 12 of which the first has pivoted to its extremity a third link 13 and the latter has similarly pivoted to its outer end a link 14. Each link has in its under side a notch 15 formed to receive one of the projections 9, and the length of these links is such that if desired the projections of all of the links 8 may be simultaneously entered in their recesses 15. Thereafter if the lever 10 be turned on its pivot 16, all of the valves 5 will be simultaneously adjusted to their open or closed positions as the case may be. If, however, the nature of the work to be performed by the machine should be such as to require, for example, that fertilizer be distributed from the three outer openings adjacent the opposite ends of the container respectively, the two links 11 and 12 would be so raised as to disengage the projections 9 of the two inner groups of valves, while the links 13 and 14 would still remain connected to the bars 8 of said outer groups of valves.

The openings controlled by these latter valves would then be under the control of the lever 10 while the valves ordinarily connected to the links 11 and 12 would be inoperative, remaining in their closed positions. Fertilizer or other granular material would then be allowed to pass out of the discharge openings adjacent the wheels when the lever 10 was moved in one direction and would be cut off when it was moved sufficiently in the opposite direction.

Under these conditions the links 11 and 12 would be frictionally held in the positions shown in Fig. 1 or would slide on the upper edges of the projections 9 when the lever 10 was moved. On the other hand if it should be desired to open or close the two central groups of valves while leaving the outer groups permanently closed, the links 13 and 14 would be disengaged from the projections 9 of said latter groups while the links 11 and 12 would be manipulated to cause the lugs or projections 9 connected to the two center groups of valves to enter their recesses. In such case the links 13 and 14 would merely slide on the tops of the projections 9 attached to the bars connecting the outer groups of valves, while the inner groups of valves would be bent or closed by operation of the lever 10.

Whenever one or more groups of the valves is opened, the granular material from the box or container 1 falls on the downwardly inclined surfaces of the extensions 6 of said valves and is thereby directed in relatively thin sheets of substantially uniform thickness upon the hills or furrows where it is required.

If desired one or more valves of any group or groups may be quickly disconnected from its bar 8 (to which it is detachably bolted) so that under operating conditions it or they may remain closed. Obviously the number of groups of valves and consequently the number of bars 8 and links may be varied without departing from my invention and if desired all of the links may be engaged with their bars so that all of the valves connected to the latter may be opened or closed simultaneously.

I claim:—

1. The combination of a container having a plurality of outlets; a series of groups of valves controlling said outlets; an operating member; and a link for each group of valves permanently connected to the operating member and detachably connected to cause operation of the valves of its particular group.

2. The combination of a container having a plurality of outlets; a series of valves controlling said outlets; a valve operating member; a series of links connected to said member; and means for detachably connecting each of said links to at least one of the valves.

3. The combination of a container having a plurality of outlets; a series of groups of valves controlling said outlets; members respectively connecting together the valves of each group; a valve operating lever; and means for connecting any or all of said members to said lever at will.

4. The combination of a container having a plurality of outlets; a plurality of groups of valves controlling said outlets; bars for connecting the valves of each group; an operating member; with a plurality of links connected to said member and means for detachably connecting each of the links with one of the bars.

5. The combination of a container having a plurality of outlets; a plurality of groups of valves controlling said outlets; means for respectively connecting together the valves of each group independently of those of the other groups; an operating member; a series of pivotally connected links connected to the member; and means for connecting each link to the valves of one group.

6. The combination of a container having a plurality of outlets; a series of plates constituting valves pivotally connected to the container adjacent the outlets respectively; a plurality of the bars each connected to a group of said valves; a series of pivotally connected links; means for detachably connecting each of the links to one of the bars independently of the other links; and means for moving the links to open or close the valves.

7. The combination of a container having a plurality of outlets; a plate pivotally mounted adjacent each outlet and having a downwardly bent portion; with means for swinging said plates on their pivots to permit material to be delivered from the container through the outlets upon the downwardly inclined portions of the plates.

WILLIAM D. HAINES.

Copies of this patent may be obtained for five cents each, by addressing the "Commissioner of Patents, Washington, D. C."